United States Patent [19]

Salvati

[11] Patent Number: 4,998,163
[45] Date of Patent: Mar. 5, 1991

[54] STEPPING MOTOR CONTROL HAVING A DYNAMICALLY VARIABLE LOOP FILTER CIRCUIT

[75] Inventor: John R. Salvati, Skaneateles, N.Y.

[73] Assignee: Welch Allyn, Inc., Skaneateles Falls, N.Y.

[21] Appl. No.: 502,993

[22] Filed: Apr. 2, 1990

[51] Int. Cl.[5] ............................................. H04N 9/04
[52] U.S. Cl. .......................................... 358/42; 358/98
[58] Field of Search ...................... 358/41, 42, 98, 58; 128/4, 6, 11; 388/911, 811, 813

[56] References Cited

U.S. PATENT DOCUMENTS 4,074,306  2/1978  Kakinuma et al.
4,523,224  6/1985  Longacre, Jr.
4,546,379  10/1985  Sarofeen et al. ...................... 358/42
4,631,582  12/1986  Nagasaki et al. ...................... 358/42
4,924,166  5/1990  Roussel ............................. 388/813

Primary Examiner—Howard W. Britton
Assistant Examiner—Fim Yen Vu
Attorney, Agent, or Firm—Wall and Roehrig

[57] ABSTRACT

Apparatus for controlling a stepping motor drive system during start up and maintenance of a desired oeprating speed. A dynamically variable loop filter i.e. a boot strap loop filter is used in a phase locked loop circuit to ramp the stepping motor to operative speed faster and with less transient instability than heretofore available. Protection from transients tending to cause slower or faster speeds is obtained with the same circuits. Stall sensing and restart capabilities are provided and the circuits use fewer components and less PCB real estate than prior art.

15 Claims, 3 Drawing Sheets

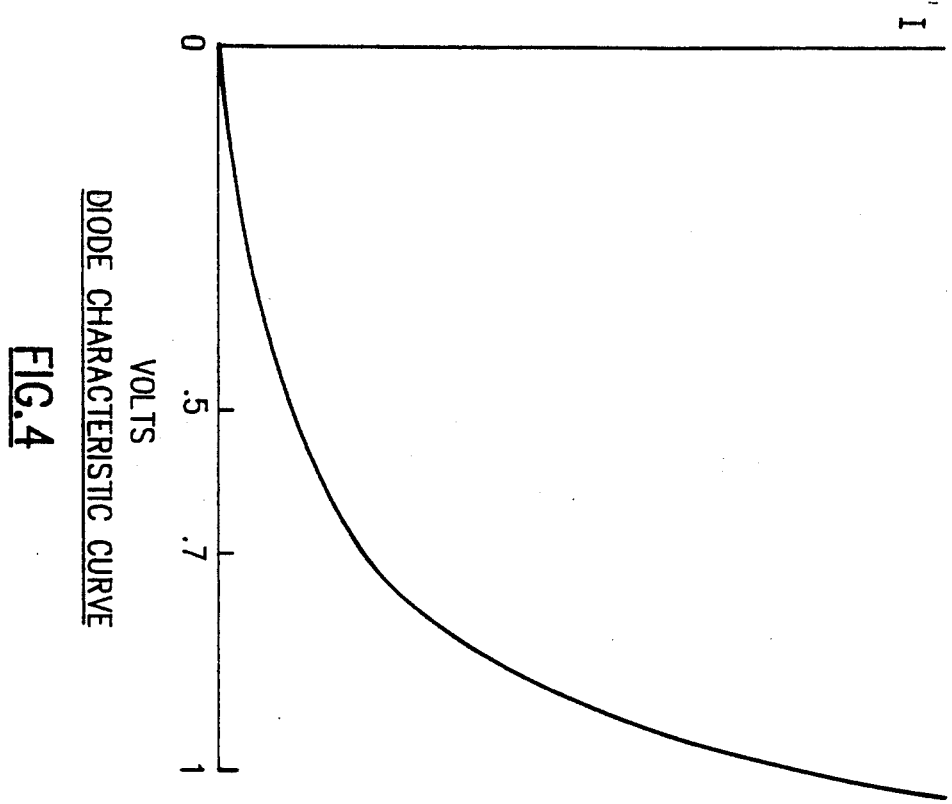
FIG.4 DIODE CHARACTERISTIC CURVE
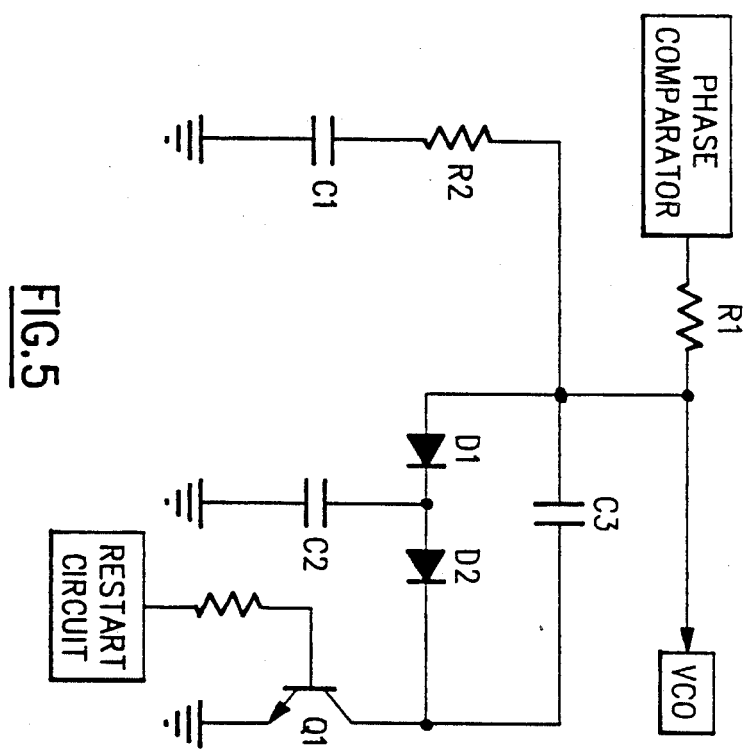
FIG.5

4,998,163

STEPPING MOTOR CONTROL HAVING A DYNAMICALLY VARIABLE LOOP FILTER CIRCUIT

BACKGROUND OF THE INVENTION

This invention relates to control systems for driving stepping motors and more particularly to a dynamically variable loop filter drive control circuit for synchronizing a color filter wheel for a color video borescope.

The use of color video systems for viewing remote regions has become a powerful diagnostic tool in the industrial and medical fields. In U.S. Pat. No. 4,074,306, a color endoscope is disclosed wherein a filter wheel is employed to sequentially illuminate a target to provide color separated image information which is processed in the video system to present a color separated image of the target area one over the other upon a television screen. As can be seen, both a sharp image and a faithful reproduction of the original colors is important in making an accurate diagnosis and any loss of image registration or the like will adversely affect the results of the examination.

In U.S. Pat. No. 4,523,224 to Longacre, there is shown an open loop motor control unit for synchronizing the stepping rate of the motor to the field rate of the video system in response to the master clock signal so that the filters are brought past the fixed optical path in timed sequence with each of the video field periods.

OBJECTS AND SUMMARY OF THE INVENTION

It is therefore an object of the present invention to provide an improved stepping motor drive control system for filter wheel drives in video systems.

It is another object of the present invention to provide a stepping motor drive control system that results in faster "lock up" and less "settling" times.

It is another object of the present invention to provide a control circuit for stepping motors that provides more protection from transient events such as pulses, shock, vibration, switching from color to black and white, and the like.

It is a further object of the present invention to provide a stepping motor drive control system requiring fewer components and less PCB real estate.

It is a still further object of the present invention to provide a stepping motor drive control system that is dynamically variable to smoothly compensate for changes in motor speed.

These and other objects of the present invention are attained by a dynamically variable loop filter in a phase locked loop circuit that ramps the stepping motor up to operating speed and maintains operating speed with less transient instability by actively varying band width of one or more filter loops.

BRIEF DESCRIPTION OF THE DRAWINGS

For a better understanding of these and other objects of the present invention, reference is had to the following detailed description of the invention which is to be read in conjunction with the accompanying drawings wherein:

FIG. 4 is a typical plot of current versus voltage for a diode; and

FIG. 5 is a view similar to FIG. 2 of another embodiment of the present invention.

DETAILED DESCRIPTION OF THE PREFERRED EMBODIMENT

Figure 1:
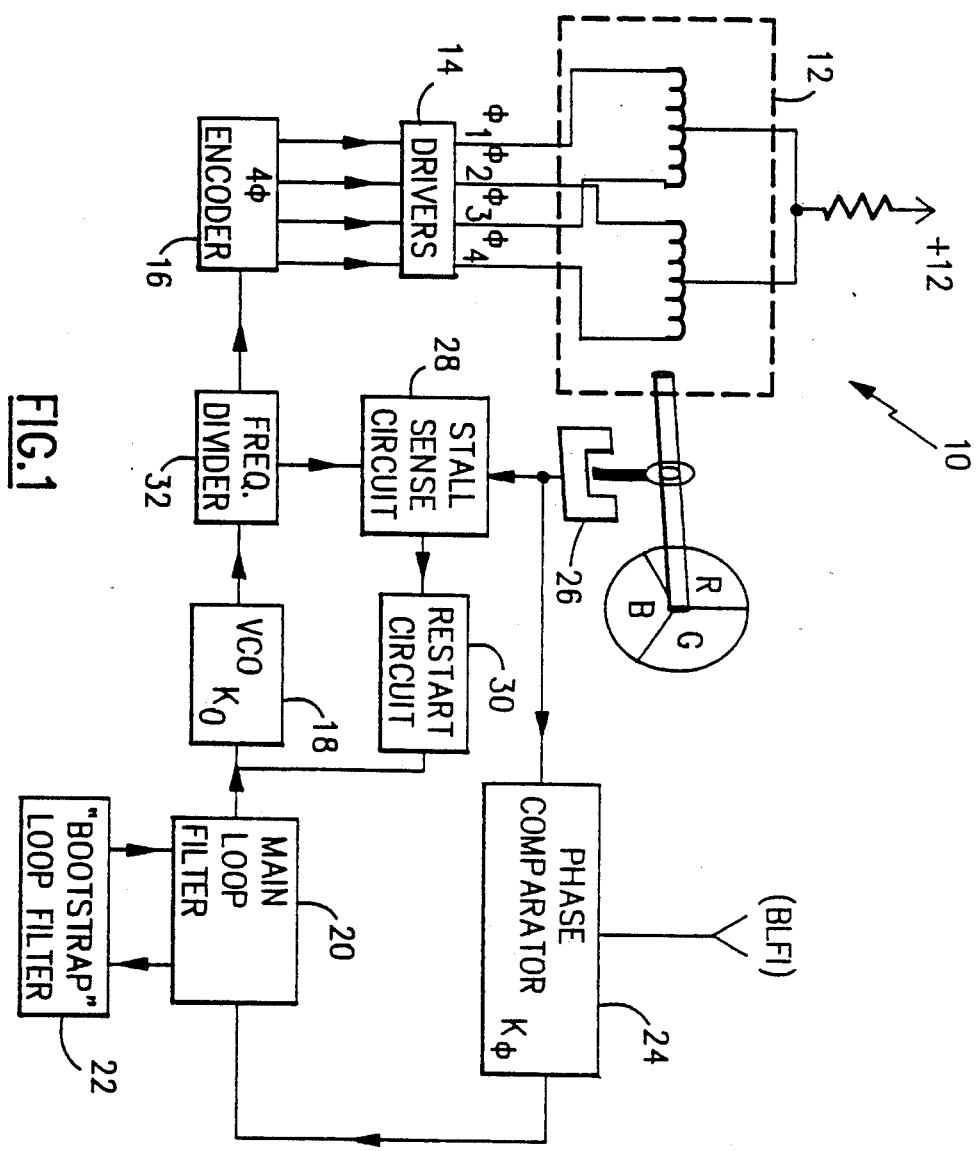
FIG. 1 is a block diagram of a stepping motor control circuit according to the present invention.

Referring now to FIG. 1, there is shown in block diagram form a stepping motor drive circuit for driving and controlling the speed of a color filter wheel for a video system to be used in an endoscope, borescope and the like. Not only is the stepping motor 10 driven by this circuit, but it is also synchronized with the blue field index (BFI) from the video system to which the speed of the color wheel must be synchronized. The stepping motor 10 consists generally of the motor itself 12, the driver circuits 14, and the four phase encoder circuits 16 which are well known in the art and shown in the above mentioned patent to Longacre as well as other publications.

The drive circuit for the stepping motor consists basically of voltage controlled oscillator 18, the main loop filter 20, the boot strap filter 22, and the phase comparator 24. A timing pin 26 is mounted on the color wheel shaft in alignment with the blue field filter. An optical sensor 27 for sensing the rotation of the timing pin 26, to provide a motor speed and index signal along with an input from the blue field index (BFI) from the video color system complete the basic circuit for the control and synchronization of the stepping motor 10. A stall sensing circuit 28 and a restart circuit 30 are provided, as will be described in detail herein and a frequency divider 32 is used to convert the voltage control oscillator 18 output to the proper frequencies for input to the four phase encoder 16.

This circuit will start the stepping motor from rest, ramp it up to the operating speed dictated by the frequency of BFI and provide positional accuracy of the color wheel by locking the selected wheel location, indicated by the timing pin 26 and optical sensor 27 to the rising edge of the BFI signal from the video system. The circuit also senses massive changes in circuit speed such as stalling and restarts the circuit as appropriate.

In the prior art, as exemplified by the above Longacre patent, the drive control circuit for the stepping motor involved a considerably greater number of components and circuit board (PCB) real estate since the motor was synchronized with the master video clock through a series of frequency dividers and a ramp up phase lock circuit was provided for bringing the motor from start to operating speed. Two switches were required to indicate stall condition and the proper position lock up, through several frequency counters and dividers to insure proper synchronization from a positional standpoint and restart after stalling. The Longacre system basically used the phase lock circuit to ramp the motor to approximate operating speed and then dropped it out and switched over to synchronization with the master clock. This provided a very satisfactory control of the stepping motor and has served a very useful function for many years.

The circuit, as shown in FIG. 1, is a much simpler and more direct solution to the problem of starting, ramp up and speed control and offers a greater dynamic range of control than possible with circuits such as that disclosed in the Longacre patent. In essence, what applicant has provided is a dynamically variable loop filter circuit that performs all functions of the multiple circuits previously required.

Figure 2:
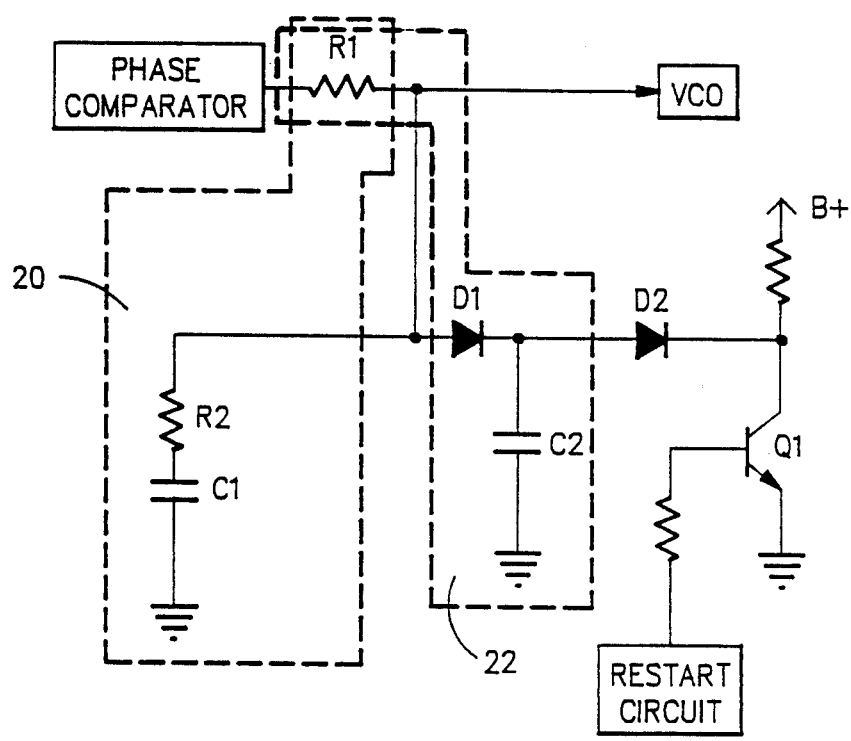
FIG. 2 is a schematic diagram of the dynamically variable loop filter of the present invention.

As may be seen in FIG. 2, this circuit can be simplified to a main loop filter 20 and a boot strap loop filter 22, basically connected in parallel to each other and in series with a resistance R1 to the output of the phase comparator 24. As may be seen from FIG. 1, the phase comparator 24 has inputs of the timing pin signal, which indicates the position of the color filter wheel, and the blue field index (BFI) with the resultant being an output voltage proportional to the difference. This will ramp the motor 12 up to the desired operating speed and then control the speed plus or minus from that level.

On initial start up as the output of the phase comparator starts to go positive, it will cause current to flow through the resistor R1 into the two filter loops 20 and 22. Capacitor C2 is chosen to be substantially greater than capacitor C1 in available capacitance and in one instance, it is ten times the capacitance of C1. Therefore, initially at start up C2 will be charged up by taking most of the current through diode D1 and resistance R1. Very little charging will occur through R2 and C1 at this stage of the start up procedure. As the voltage output of the phase comparator increases across the R1, D1, C2 loop filter, the input to the voltage control oscillator 18 will increase and bring the oscillator up towards its operating frequency as rapidly as possible, consistent with the start up characteristics of stepping motor 12. Briefly, as will be described in detail herein, as the voltage rises and as the capacitor C2 becomes fully charged, the flow through boot strap filter 22 will gradually decrease and eventually the boot strap filter 22 will be effectively locked out of the circuit and the main loop filter 20 will take over.

This dynamic loop filter circuit basically controls the capture, lock up, band width and transient response of the color wheel motor circuit. The complete motor control system forms a phase locked loop of a second order. To fully explain the unique application of this dynamically variable loop filter to the control of the stepping motor, it will be useful to review the basic mathematics of a second order system. Equation 1 and diagram 1 illustrate the properties of a conventional second order phase lock loop.

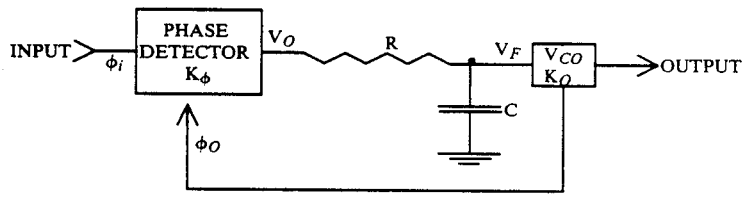

$$S^2 + 2\zeta\omega_n + \omega_n^2 \quad [1]$$

where
$\zeta$ = damping factor
$\omega_n$ = loop natural frequency
The transfer function of the low pass filter of diagram 1 is shown in equation 2.

$$F(s) = 1/1 + T_s \quad [2]$$

where:

$$T = RC$$

After substituting, reducing and solving, the transfer function can be seen as shown in equation 3:

$$T(s) = \frac{\phi_o(s)}{\phi_i(s)} = \frac{K_\phi K_o F(s)}{S + K_\phi K_o F(s)} \quad [3]$$

By substituting the transfer function of equation 2, the transfer function of the network becomes as shown in equation 4.

$$T(s) = \frac{K_\phi K_o/T}{S^2 + (1/T)S + (K_\phi K_o/T)} \quad [4]$$

Equating equation 4 with the general second order form of equation 1 results in equation 5 from which it can be seen that the damping factor $\zeta$ has a direct relationship to the RC filter.

$$\zeta = \tfrac{1}{2}(1/K_\phi K_o T)^{\tfrac{1}{2}}$$

$$\omega_n = (K_\phi K_o/T)^{\tfrac{1}{2}} \quad [5]$$

Specifically, as the RC time constant gets longer, $\zeta$ becomes smaller, resulting in less damping and greater settling time. In fact, as $\zeta$ approaches 0, the filter circuit becomes a sinusoidal oscillator of frequency $\omega_n$.

This property of the loop filter becomes very important because by the inherent nature of a stepping motor, it must be ramped up to operating speed. If the desired operational stepping rate were immediately applied to the motor driver at start up, the driver would be unable to handle the high stepping rate and the motor would lock in one position and fail to start.

For instance, with a Nippon PF25-25D1 stepping motor, a time constant of one to two seconds is needed to properly ramp the motor up to speed. While an Eastern Air Devices LD11, EAM-3S will require from two to four seconds to ramp up to operating speed.

Figure 3:
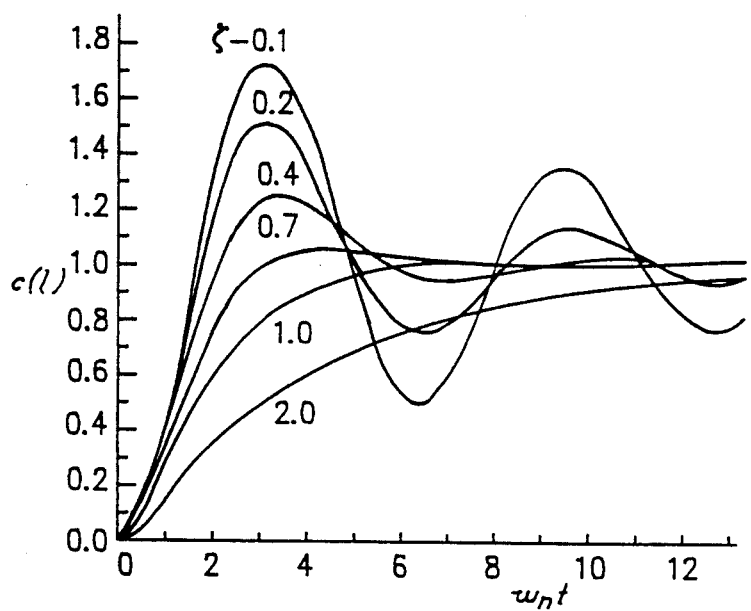
FIG. 3 is a chart showing transient response time of a second order system.

Another factor, however, that must be taken into account in any second order system, is the settling time to reach a steady state operating condition. As shown in FIG. 3, this damping factor becomes very important in rapidly settling out the motor from start up to operating speed, and also in resisting transient disturbances so as to recover in as short a time as possible. As may be seen in FIG. 3, the lower the damping factor, i.e. 0.1, the more nearly sinusoidal the output of the system, while if a damping factor of approximately 0.7 can be achieved, an ideal compromise is obtained where a fast ramping up to operating speed with very little oscillation is obtained.

It thus can be seen that while the desired high damping factor is desirable from a steady state operating standpoint, it is slow acting and would take an inordinate amount of time to get the stepping motor up to operating speed. While the start up time must be adhered to and can be accomplished with a relatively low damping factor, i.e., a high RC time constant, if this circuit were allowed to control the steady state running of the device, it could very well take several minutes for the motor to reach a steady state operating condition (see curve for $\zeta=0.1$) and if hit by a step or impulse function, the resettling time to settle out within five percent of the steady state speed could easily take minutes. This is why after ramping the motor up to approximate operating speed, Longacre switched over to synchronizing the control of the motor from video system master clock.

To overcome this performance limitation of a conventional phase lock loop stepping motor circuit, the present applicants have devised a dynamically variable loop filter system in which a boot strap loop filter having a low band width and thus large time constant, is used to start the stepping motor and ramp it up towards the desired synchronous operating speed. A main loop filter having the opposite characteristics is essentially connected in parallel and as the stepping motor is brought up to speed, the loop band width of the boot strap filter is gradually increased, decreasing the time constant and increasing the damping factor $\zeta$ so that the motor will settle to synchronous speed faster than a conventional loop and will have improved transient response afforded by the increased damping factor.

Referring again to FIGS. 2 and 4, it can be seen that as the boot strap loop filter approaches operating speed and thus the operating input voltage for the variable control oscillator, its effect is gradually decreased as a function of the characteristics of the diode D1. These characteristics are plotted for a typical diode in FIG. 4, which shows that as the voltage is high and the current is high through the diode, the resistance of the diode is very low, and therefore, the time constant large, but as the current decreases and we come back down the curve of FIG. 4 to approximately 0.7 volts, which is the cutoff point of a typical silicone diode, the apparent resistance of the diode has increased very significantly and the boot strap loop filter D1 and C2 is essentially removed from the circuit. At this point, the main loop filter 20 consisting of R2, C1, and R1 takes over, and since this has a relatively small time constant, the damping factor is much larger and the motor settles to synchronous speed rapidly, and with very little transient disturbance.

If a massive disturbance upsets the motor speed, such as stalling or severe vibration, there is provided a circuit 30 to automatically reduce the band width of the boot strap loop filter and to thus reinitiate start up.

This may be seen by referring to FIGS. 1 and 2 in which there is shown the restart circuit 30 which is connected between the stall sensor circuit 28 and the dynamically variable loop filter circuit 22. This consists essentially of a transistor Q1 connected between B+ and ground, and connected to the boot strap loop filter 22 through a second diode D2. The restart circuit is essentially a switch which causes Q1 to conduct and thus allow C2 to discharge through D2 to ground which then allows the boot strap loop filter 22 to take over the restarting of the stepping motor as originally described above. The transistor Q1 is turned off after discharge of C2 for normal circuit operations.

Thus, in operation when the stepping motor 12 is to be cold started, both C1 and C2 are discharged. The phase comparator 24 begins to source current through R1 to charge both the main loop filter 20 and the boot strap loop filter 22. Since C2 is substantially greater than C1 on the order of 10 to 1 and D1 is in forward conduction, the dominant factor in the loop transfer function is the time constant T = R1, C2. This is optimized for start up and ramping of the stepping motor up to speed. As the two loops charge, the voltage controlled oscillator input voltage rises and as may be seen in FIG. 1, the rotational speed of the stepping motor increases. As the motor reaches operational speed, the charging current into C2 tapers off according to the diode characteristics of D1, as shown in FIG. 4. Thus, for a typical silicon diode, diode D1 stops current flow to C2 when the voltage controlled oscillator input voltage is 0.6 volts or less away from the preset voltage controlled oscillator operating voltage corresponding to synchronous speed. At this point, C2 is effectively disconnected from the loop and the main loop filter 20 (consisting of R1, R2, and C1) dominates the loop transfer function and takes over the steady state operation of the motor. This main loop filter 20 is optimized for the steady state operation of the motor and for resistance to operational transients with a higher band width and damping factor and lower time constant.

This allows faster settling time to steady state speed and more protection against transient conditions, such as impulse or unit step type inputs.

Importantly, it should be noted that the changeover from the boot strap filter 22 dominating the ramping up of the motor speed to the main loop filter 20 occurred gradually over time as the speed increases in accordance with the diode D1's characteristic curve. If instead of diode D1 a switch were employed to switch the system over a severe transient generated by the opening or closing of the switch would upset the loop negating any advantage gained by this dual loop architecture. This smooth changeover from low to high band width loop response allows the phase lock loop to dynamically track the motor's requirements.

As previously indicated, if a massive disturbance in motor speed occurs, i.e., power surge, brown out, physical stalling of the motor by a technician putting his finger in the way, the restart circuit comes into action. The restart circuit measures actual motor speed through the sensing circuitry 27 and compares this speed to the frequency of the drive pulses applied to the motor windings. This frequency is derived from the voltage controlled oscillator as shown in block diagram in FIG. 1. If the actual motor frequency differs from the driving frequency by a preset percentage indicating a fault condition, the transistor Q1 is turned on to discharge the boot strap loop filter capacitor C2 to a known start up condition and the transistor Q1 is then turned off. The circuit is then returned to start up condition as described herein.

When the above circuits as shown in FIGS. 1 and 2 have reached the steady state motor control operating condition, further transients tending to increase the voltage from the phase comparator will be bled off by the boot strap loop filter 22 as were the ramping up charges so that the circuit is dynamically resistant to transient interference of an over-voltage characteristic.

Referring now to FIG. 5, there is shown another embodiment of the present invention in which not only is the ramp up of the system accommodated, but the resistance to transients of both positive and negative kind are provided for, resulting in an improved transient resistant motor control circuit. As may be seen, the basic main loop filter 20 (R1, R2, C1) remains unchanged and the basic boot strap loop filter 22 (R1, D1, C2,) again is essentially unchanged. The addition of C3, D2 in the output of the transistor circuit Q1 provides an additional transient control capability.

As indicated previously, the boot strap filter 22 functions as a low pass filter for voltages greater than 7/10 of a volt for a silicon diode permitting charging of the capacitor C2 during ramp up and any transient in steady state greater than this 7/10 voltage differential. In the situation where the voltage differential from steady state should go negative by more than 7/10 of a volt for a silicon diode, this difference will allow capacitor C2 through diode D2 to charge capacitor C3 to provide additional voltage at the input of the voltage controlled oscillator and to compensate for the loss of voltage caused by the low voltage transient. There is thus provided a dynamically variable filter loop for both over and under voltage transients providing a much more stable motor control drive circuit for a stepping motor for driving a color filter wheel or other device where precise control of speed is required.

For a massive disruption of the motor control speed, the stall sensing circuit 28 would again turn on restart circuit 30 to cause transistor Q1 to conduct to discharge both C2 and C3 to ground. This would thus reconfigure the boot strap loop filter 22 to the start up configuration previously described.

While this invention has been explained with reference to the structure disclosed herein, it is not confined to the details as set forth and this application is intended to cover any modifications and changes as may come within the scope of the following claims.

What is claimed is:

1. A stepping motor control circuit for starting and maintaining a desired motor operating speed comprising in combination:
    a voltage controlled oscillator;
    a phase comparator;
    means for providing a motor speed signal;
    means for providing a desired speed signal;
    said motor and desired speed signal means being connected to the input of said phase comparator; a main loop filter; a boot strap loop filter;
    said main and bootstrap loop filters being connected in parallel in operative relation with said comparator and said voltage controlled oscillator; and
    means for gradually removing the bootstrap loop filter effect from the circuit as the stepping motor approaches operating speed.

2. A stepping motor as defined in claim 1, further defined by a stall sensor connected at the input to the output of said means for providing a motor speed signal and at the output to a restart circuit connected to said bootstrap loop filter to reset said filter loop to start up condition.

3. In a color video system of the type having a motor driven color video wheel, apparatus for synchronizing the color video wheel with the video field rate of the system that includes:
    a rotatably mounted color filter wheel having a series of different color filters that are passed in sequence through a fixed optical axis as the wheel is rotated;
    a stepping motor operatively connected to said color wheel for rotation thereof;
    a color wheel drive circuit operatively connected to said stepping motor for rotating said motor in response to an input stepping signal applied thereto;
    a second order phase locked loop filter circuit connected to said drive circuit;
    said second order phase locked loop filter circuit further including a phase comparator, a voltage controlled oscillator, a main loop filter and a bootstrap loop filter;
    said bootstrap loop filter being operatively connected with said main loop filter to form an RC network having a dynamically changing time constant;
    means to effectively remove said bootstrap loop filter from the circuit when the stepping motor approaches operating speed; and
    a timing pin and optical sensor for indicating color wheel position and speed.

4. An apparatus as described in claim 3 wherein said bootstrap loop filter comprises first and second RC networks connected oppositely to each other to provide additional low band pass filtering for transients both above and below steady state.

5. In a color video system of the type having a rotatably mounted color filter wheel having a series of different color filters that are passed in sequence through a fixed optical axis as the wheel is rotated; and a stepping motor operatively connected to said color wheel for rotation thereof; apparatus for synchronizing the color video wheel with the video field rate of the system that includes:
    a color wheel drive circuit including a stepping motor encoder and driver circuit connected to the stepping motor;
    a voltage controlled oscillator circuit connected to the input of said encoder and driver circuit;
    a dynamically variable loop filter circuit connected to the input of said voltage controlled oscillator;
    a timing pin operatively connected to rotate with said color wheel;
    an optical sensor circuit for sensing the rotation of said pin; and
    a phase comparator circuit for comparing the output signal from said optical sensor and a field index signal from the video system connected to the input to said dynamically variable loop filter circuit.

6. The apparatus of claim 5 that further includes a speed sensor circuit and a restart circuit operatively connected between said optical sensor circuit and said dynamically variable loop filter circuit to reset said loop filter circuit to start up mode upon a massive disturbance of the stepping motor speed.

7. The apparatus of claim 5 wherein the dynamically variable loop filter circuit comprises a first RC network having a low time constant, a second RC network having a high time constant operatively connected with said first network, and dynamically variable circuit means connected in said second RC network for gradually decreasing the time constant thereof as the stepping motor approaches operating speed.

8. The apparatus of claim 7 wherein said dynamically variable circuit means includes a diode connected for conduction from the resistive to the capacitive elements of said second RC network.

9. The apparatus of claim 5 wherein the dynamically variable loop filter circuit comprises a first RC network having a high bandwidth filtering action; a second RC network having a low bandwidth filtering action connected to provide additional low pass filtering when transients are above steady state; a third RC network having a low bandwidth filtering action, said third RC network being connected effectively opposite to said second RC network to provide additional low pass filtering when transients are below steady state.

10. The apparatus of claim 9 further defined by dynamically variable means connected in said second and third RC networks for gradually increasing the bandwidths thereof, as the stepping motor approaches operating speed.

11. An apparatus as defined in claim 5 wherein said dynamically variable loop filter circuit includes:
a main loop filter and a bootstrap loop filter connected in parallel between the phase comparator and voltage controlled oscillator and ground.

12. An apparatus as defined in claim 11 wherein said main loop filter has a high bandpass and said bootstrap loop filter has a bandpass variable from low to high.

13. Apparatus of claim 12 further defined by means for effectively removing said bootstrap loop filter from the circuit as the stepping motor approaches operating speed.

14. A method of controlling the rotational speed of a color filter wheel in a video system that includes the steps of:
driving a color filter wheel with a stepping motor to sequentially advance different color filters past a fixed optical axis;
applying the output of a voltage controlled oscillator to the input of said stepping motor;
deriving a control voltage for said voltage controlled oscillator by comparing a timing pulse from said color wheel and a field index signal from a video system;
applying said control voltage to a dynamically variable loop filter circuit before applying it to the input of said voltage controlled oscillator;
limiting the magnitude of said control voltage by adjusting the time constant of the dynamically variable loop filter circuit to a level suitable for ramping the stepping motor up to operating speed; and
varying the time constant of said dynamically variable loop filter circuit proportional to the difference between desired and actual motor speed.

15. A method of controlling the rotational speed of a color filter wheel in a video system that includes the steps of:
driving a color filter wheel with a stepping motor to sequentially advance different color filters past a fixed optical axis;
applying the output of a voltage controlled oscillator to the input of said stepping motor;
deriving a control voltage for said voltage controlled oscillator by comparing a timing pulse from said color wheel and a field index signal from a video system;
applying said control voltage to a variable loop filter circuit;
dynamically varying the time constant of said variable loop filter circuit as the stepping motor changes speed; and
applying the output of said variable loop filter circuit to said voltage controlled oscillator;
whereby said stepping motor is rapidly ramped up to stable synchronous operating speed.

* * * * *